United States Patent [19]

Nako

[11] Patent Number: 5,774,237
[45] Date of Patent: Jun. 30, 1998

[54] IMAGE READING APPARATUS

[75] Inventor: Kazuyuki Nako, Yamatokoriyama, Japan

[73] Assignee: Sharp Kabushiki Kaisha, Osaka, Japan

[21] Appl. No.: 500,095

[22] Filed: Jul. 10, 1995

[30] Foreign Application Priority Data

Dec. 26, 1994 [JP] Japan ..................................... 6-322138

[51] Int. Cl.$^6$ ............................... H04N 1/04; H04N 1/40; H04N 1/10
[52] U.S. Cl. ........................... 358/471; 358/474; 382/255
[58] Field of Search ..................................... 358/474, 488, 358/486, 493, 494, 496, 497, 498, 471; 382/106, 199, 254, 255, 256, 274; 355/311, 25, 82, 233, 234, 235, 237; 250/208.1

[56] References Cited

U.S. PATENT DOCUMENTS 5,084,611  1/1992  Okisu et al. ........................ 250/208.1
5,151,797  9/1992  Nosaki et al. ........................... 358/474
5,416,609  5/1995  Matsuda et al. ........................ 358/486

FOREIGN PATENT DOCUMENTS 0264857  11/1986  Japan ................................ H04N 1/00
5161002   6/1993  Japan ................................ H04N 1/10
5316302  11/1993  Japan ................................ H04N 1/10

*Primary Examiner*—Thomas D. Lee
*Assistant Examiner*—Jerome Grant, II

[57] ABSTRACT

An image reading apparatus is for reading a document such as a book from above with the target faces thereof placed upwardly. The apparatus allows for correction of distortions of the image, without relying on the background color of the target faces of the document. An image processing device detects the boundary between the document and a document-guiding device (the document edge) on the basis of the image read by the image reading device and corrects distortions of the image with reference to the detected boundary.

18 Claims, 10 Drawing Sheets

IMAGE READING APPARATUS

BACKGROUND OF THE INVENTION

1. Field of the Invention

The present invention relates to an image reading apparatus, and particularly to an image reading apparatus for copiers, facsimile equipment, scanners, etc., which reads documents such as books from above, with target faces placed up.

2. Description of the Related Art

In cases where an image of a document such as a page in a book is attempted to be read from above, since the target face comprises portions at a variety of levels, the read image has a gradient of magnification which increases toward the portions at higher levels. In addition, the portion of the target face which is adjacent to fastened portions of the document, being compelled to curve, produces a compressed and curved image. As prior art device for correcting distortions of such an image, there has been known an image reading apparatus which is designed to measure the level profile of the target face, wherein the image is partially scaled up or down based on the results of the measurement to correct the distortions (Japanese Unexamined Patent Publication HEI 5-161002 and Japanese Unexamined Patent Publication HEI 5-316302).

Japanese Unexamined Patent Publication HEI 5-161002 discloses two types of image reading apparatuses which are described below.

1) An apparatus which measures the level profile of the target face of the document by scanning the face with a range sensor and corrects the distortions on the basis of the measurement; and 2) an apparatus equipped with a plurality of photosensors which are arranged along a document-guiding device for positioning documents by bringing their upper or lower ends into contact therewith, and which serves to measure the level profiles of target faces of documents and to correct distortions of the images. However, the apparatus mentioned in 1) above has the problem in that it needs an additional mechanism for scanning target faces of documents and prolonged reading times. On the other hand, the apparatus in 2) above also presents the problem of the apparatus being complicated and costly.

Japanese Unexamined Patent Publication HEI 5-316302 describes an image reading apparatus provided with a unit which allows measurement of level profiles of documents and correction of distortions of the images, on the basis of the results of the measurement. In this apparatus, the surface of the document-guiding device which is brought into contact with documents is a black reflector plate, and level profiles are measured by following the procedures mentioned below. First, a image of a target face of an document is read from above. Then, the boundary between the document and the black surface of the document-guiding device (hereunder referred to as "document edge") is detected with reference to the read image. Subsequently, the level profile of the document is determined by calculation based on the results of the detection.

With the image reading apparatus described in Japanese Unexamined Patent Application Disclosure HEI 5-316302, however, since the surface of the document-guiding device which is brought into contact with documents is colored black, it is difficult to detect the boundary between the document and the document-guiding device (the document edge) in cases where the target face of the document is not white, as in the case of photographic magazines.

SUMMARY OF THE INVENTION

The present invention has been developed to overcome the aforementioned problems, and is aimed at providing an image reading apparatus for reading documents from above, with target faces placed up, which allows correction of distortions of the images to produce correct distortion-free plane images, without relying on background colors of target faces of documents.

In order to accomplish the above object, the surface of the document-guiding means of an image reading apparatus, according to a first embodiment of the invention, which is brought into contact with documents, is marked with monochromic streaks.

An image reading apparatus according to a second embodiment of the invention is equipped with means for determining the brightness of each document near the boundary of the document-guiding means, and means for varying the brightness of the surface which is in contact with the document based on the results of determination by the means for determining the brightness.

Image reading apparatuses of the invention may have a mark, which roughly indicates the point at which the center of each document is to be placed, on the surface of the document-guiding means which is brought into contact with documents.

Since the surface of the document-guiding means which is brought into contact with documents is marked with monochromic streaks, the above image reading apparatus according to the first embodiment allows detection of edges of documents, whether the documents are on-white ones or on-black ones, such as photographic magazines. In addition, more accurate detection of edges of documents is realized by reducing the spaces of neighboring streaks of the monochromic streaks, toward the portions of documents which have larger degrees of curving (e.g., fastened portions of documents).

The above image reading apparatus according to the second embodiment determines the brightness of the document near its edge, and varies the brightness of the surface of the document-guiding means which is in contact with the document in order to enlarge the difference in brightness between the surface of the document-guiding means and the document. This results in more precise detection of the document edge.

In cases where an image reading apparatus of the invention has a mark, which roughly indicates the point at which the center of each document is to be placed, on the surface of the document-guiding means which is brought into contact with documents, lateral positioning of documents is facilitated.

Since the invention allows ready and exact detection of edges of documents based on the images of target faces of the documents read from above with the target face placed up, the level profile of each target face of the documents may be accurately measured based on the results of the detection, and thus distortions and the like of read images may be corrected with precision.

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other and further objects, features, and advantages of the invention will be more explicit from the following detailed description taken with reference to the drawings wherein.

DETAILED EXPLANATION OF THE PREFERRED EMBODIMENTS

Figure 1:
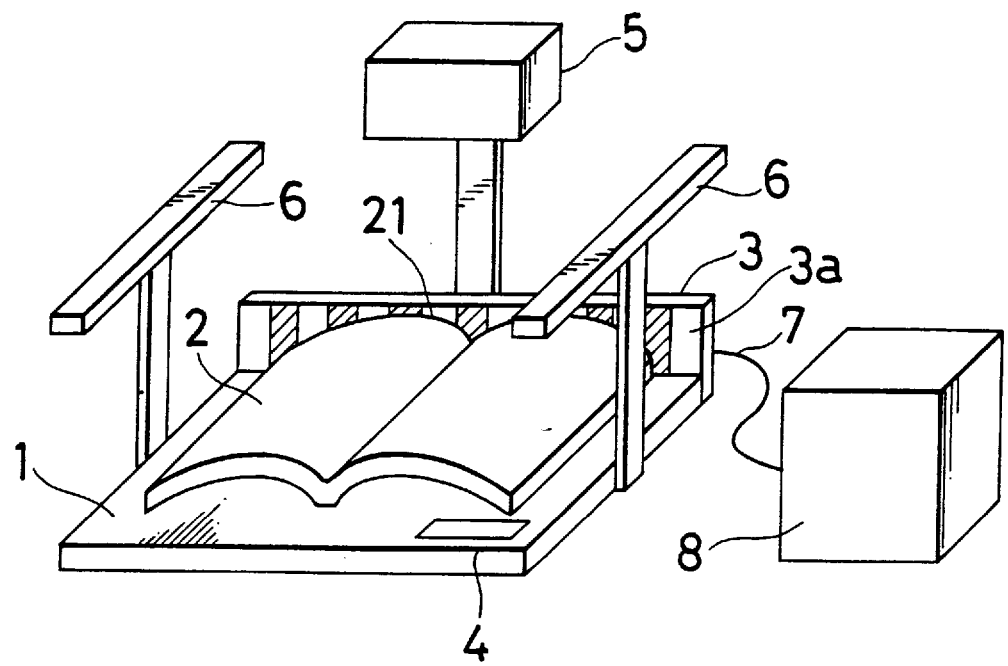
FIG. 1 is a schematic view illustrative of a first embodiment of the invention.

Now referring to the drawings, preferred embodiments of the invention are described below.

FIG. 1 is a schematic diagram illustrative of an image reading apparatus according to a first embodiment of the present invention. A document 2 such as a book is placed on a document-stacking plate 1 with a target face up, and with the upper or lower edge 21 of the document being in close contact with document-guiding device 3. An image of the document 2 is read by an image reading device 5 by operation with an operation unit 4. To ensure uniform lighting on the document 2, lighting device 6 are arranged on both sides of the document-stacking plate 1. The image read by the image reading device 5 is transmitted to an image processing device 8 through a cable 7. Here, although the image processing device 8 is isolated in FIG. 1, it may be built in the document-stacking plate 1 or the image reading device 5.

Figure 2:
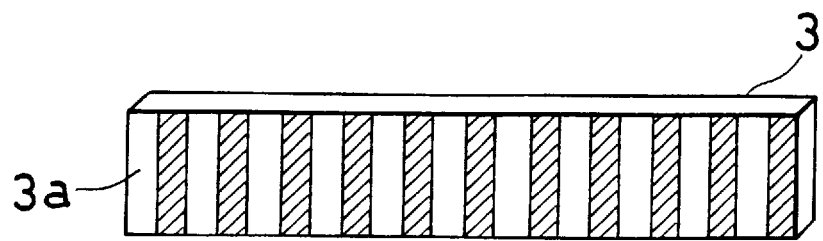
FIG. 2 is a front view of the document-guiding device shown in FIG. 1.

FIG. 2 is a front view of the document-guiding device 3. The surface 3a of the document-guiding device 3 which is brought into contact with documents (hereunder referred to as "positioning surface") is marked with monochromic streaks.

Figure 3:
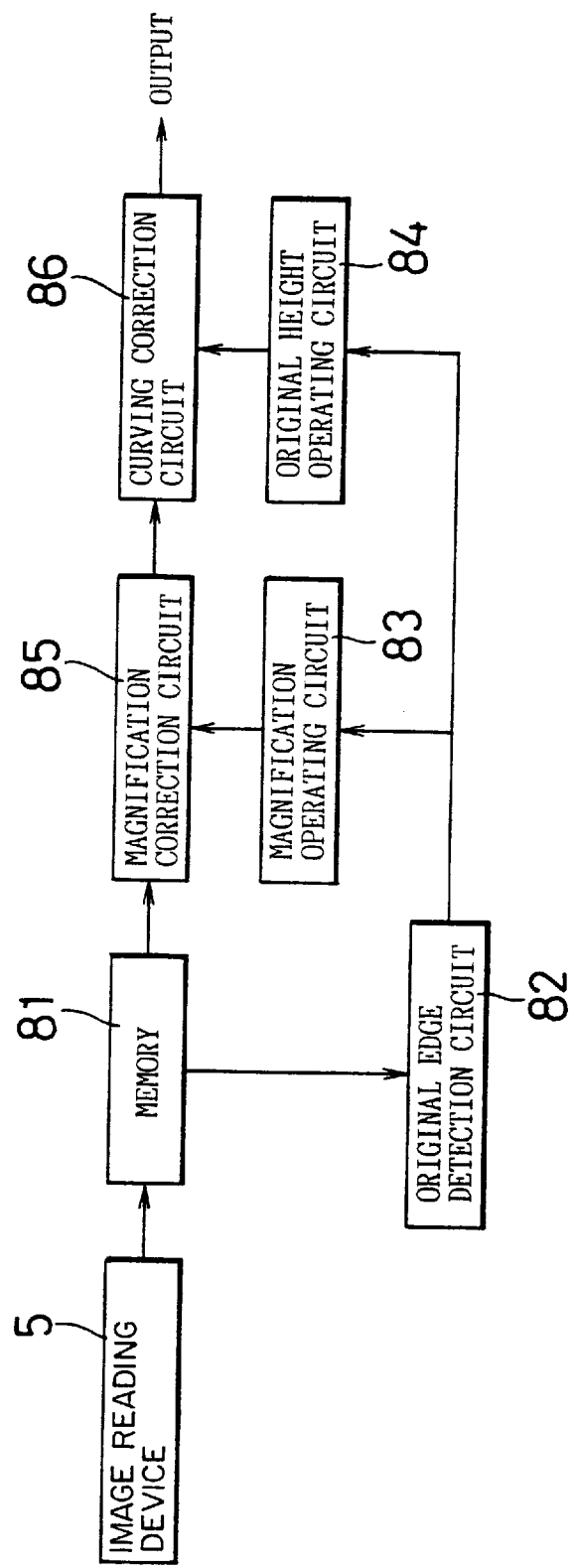
FIG. 3 is a schematic circuit diagram illustrative of the image processing device shown in FIG. 1.

FIG. 3 is a schematic circuit diagram illustrative of the image processing device shown in FIG. 1. A method of processing images will be explained below. The image read by the image reading device 5 is stored in a memory 81. A document edge detection circuit 82 detects the document edge 21, based on the image data stored in the memory 81. The information on the position of the detected document edge 21 is inputted to a magnification arithmetic operating circuit 83 where the magnification of the document 2 is calculated. A magnification correction circuit 85 utilizes the magnification to correct the image. A document height arithmetic operating circuit 84 calculates the height of the document 2, based on the positional information of the document edge 21 which has been detected by the document edge detection circuit 82. A curving correction circuit 86 corrects the curving of the document 2, based on the information about the height of the document 2. The aforementioned respective components will now be explained in further detail.

Figure 4:
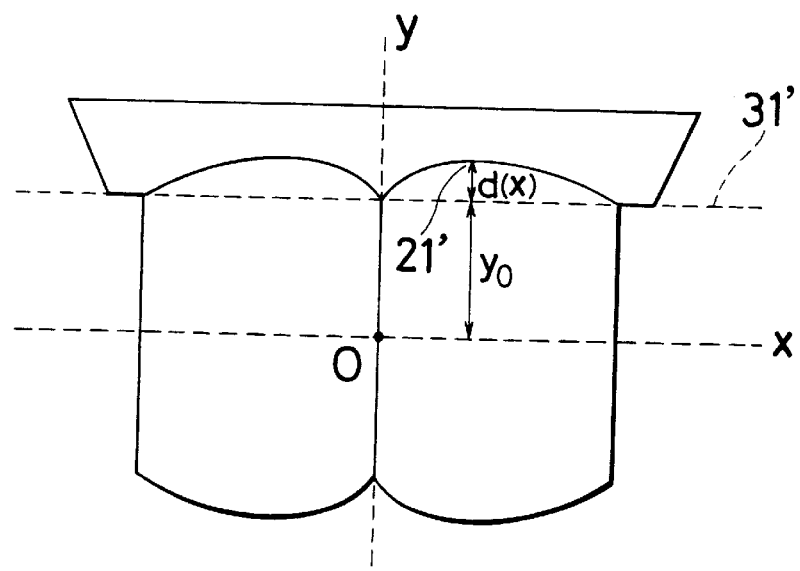
FIG. 4 is an illustration which shows an image of an document which is read from above with an image reading device according to the invention.

The image reading device 5 reads the document 2 with a lens set immediately above or near the central point of the document 2. FIG. 4 is a view illustrative of a read image. Here, it is assumed that the entire height of the target face of the document is uniform along the y-direction (the vertical direction of the document 2). In this case, the image of the document 2 is magnified in both the x-direction (the horizontal direction of the document 2) and the y-direction with a ratio increasing from the origin O toward portions of the target side at higher levels. The document 2 is read with a line sensor, and reading may be performed while moving the lens and the line sensor in the x-direction. In this case, of course the read image has not been magnified in the x-direction. In FIG. 4, 31' indicates the position, on the image, of the reference line in the lower portion of the document-guiding device 3. The document edge 21 is indicated at the position 21' on the image which deviates upward from the reference line 31' by d (x) along the y-direction.

The memory 81 stores digital data obtained by conversion of the above read image.

The document edge detection circuit 82 converts the image data stored in the memory 81 into binary units by means of appropriate threshold values and detects the boundaries of the monochromic streaks on the positioning surface 3a. The document edge 21 may be detected, whether the background color of the target side of the document is black or white, because the boundaries of the streaks break at the document edge 21. Since the detection method according to the present embodiment can detect the document edge only partially, the entire document edge 21 must be captured by interpolation from the detection data by the use of a spline function, etc.

Figure 5:
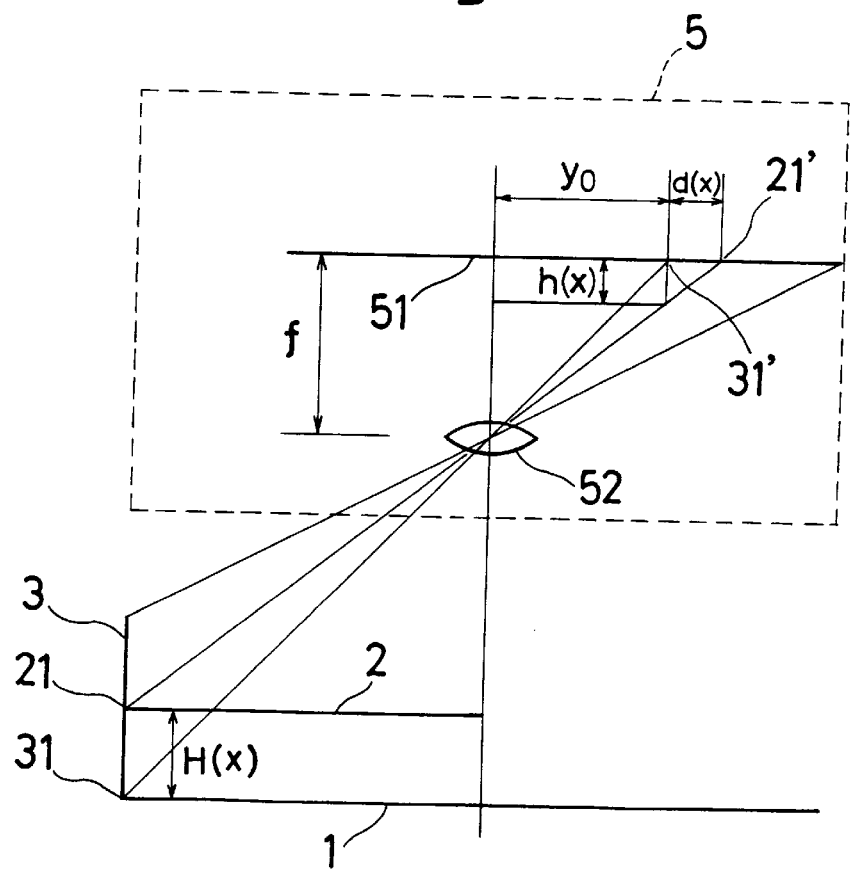
FIG. 5 is an illustration of an arithmetic method which is used for calculation of magnifications and heights of documents according to the invention.

The magnification arithmetic operating circuit 83 will now be explained. As shown in FIG. 4, the read image has been magnified starting from the origin O in the x-direction and the y-direction, with increasing magnification toward the portions of the read face at higher levels. The magnification arithmetic operating circuit 83 calculates the magnification from outputs from the above document edge detection circuit 82. A method for the calculation will be explained below. FIG. 5 is a side view illustrative of the positional relationship among the image reading device 5, document 2 and document-guiding device 3. The image reading device 5 comprises an imaging element 51 and a lens 52. The image of the reference line 31 in the lower portion of the document-guiding device 3 is formed at the position 31' on the imaging element 51, while the image of the document edge 21 at a height H is formed at the position 21'. Letting f=the distance of the imaging element 51 from the lens 52, d(x)=the distance of the document edge 21' from the reference line 31' and y₀ =the distance of the reference line 31' from the x-axis, FIG. 5 shows that the magnification m(x) of the document edge at a height H(x) with respect to the reference line 31 may be expressed by Equation (1):

$$m(x) = \{y_0 + d(x)\}/y_0 \qquad (1)$$

The magnification arithmetic operating circuit 83 uses the information on the position 21', on the image, of the document edge 21 and calculates the magnification according to Equation (1).

The magnification correction circuit 85 reduces the read image shown in FIG. 3, with the origin O as the center of reduction, at a scale which is determined by the magnification calculated by the magnification arithmetic operating circuit 83. As mentioned before, since the explanation is made on the assumption that the height of the target side of the document 2 in the y-direction is constant, the arithmetic equation for the magnification correction circuit 85 is expressed by Equation (2):

$$\begin{pmatrix} x' \\ y' \end{pmatrix} = \frac{1}{m(x)} \begin{pmatrix} x \\ y \end{pmatrix} \qquad (2)$$

wherein (x, y) indicates the coordinates before the conversion, and (x', y') indicates the coordinates after the conversion.

An explanation will now be given regarding the processing through the document height arithmetic operating circuit 84. This circuit 84 is for calculation of the height of the target face of the document using the outputs from the document edge detection circuit 82, as a preparation to the processing through the curving correction circuit 86. Taking the height of the target face of the document on the image as h(x), FIG. 5 shows that the arithmetic equation is given by Equation (3):

$$h(x):d(x)=f-h(x):y_0 \quad h(x)=f \cdot d(x)/\{y_0+d(x)\} \qquad (3)$$

Figure 6B:
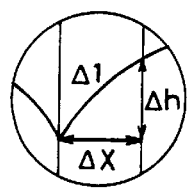
FIG. 6 illustrates how the curving of documents is corrected according to the invention.
Figure 6A:
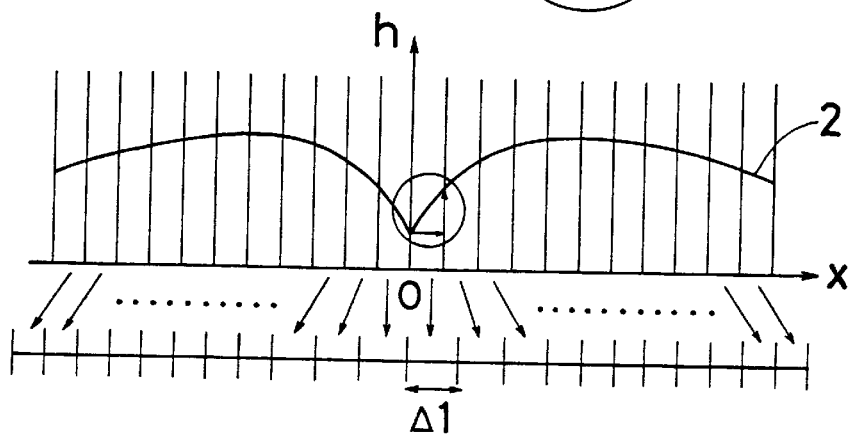
Figure 7:
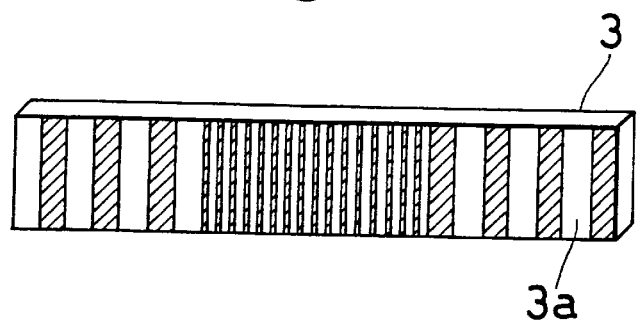
FIG. 7 is a front view of another type of the document-guiding device shown in FIG. 2.

The read image which has been reduced with an increasing ratio along the tilting directions due to curving of the target side of the document is corrected through the curving correction circuit 86. More specifically, the image is scaled up in a tilt-based manner using the information on the height which has been obtained by the aforementioned document height arithmetic operating circuit 84. FIG. 6 is a view illustrative of the processing through the curving correction circuit 86. First, the information on the height is utilized to prepare a cross sectional view of the document 2 which is taken on a line parallel to the x-axis, and then the view is sectioned with appropriate widths. Although the sections are shown to have an identical width, those sections closer to the fastened portions of the document may be prepared with smaller widths. Then, assuming that all the lines constituting the sectional profile of the face to be read in the respective sections are straight, the widths of the respective sections are enlarged with a ratio of Δ1/Δx, thus correcting the distorted image to a distortion-free plane image.

As shown in FIG. 2, since the positioning surface 3a of the document-guiding device 3 is marked with monochromic streaks in the embodiment, the document edge 21 may be detected, whether the background color of the document 2 is white or black (as in the case of photographic magazines), and thus distortions of the image may be corrected.

Figure 8:
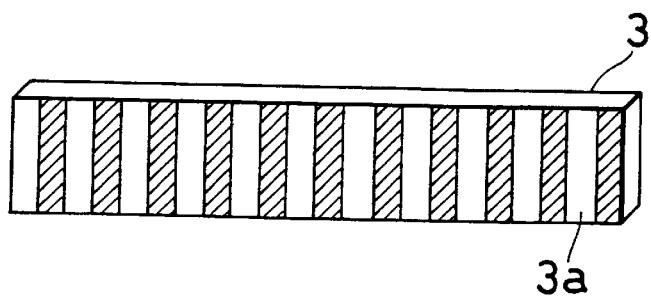
FIG. 8 is a front view of an additional type of the document-guiding device shown in FIG. 2.

Preferably the document-guiding device 3 is designed in such a manner that streaks are spaced greater which are brought into contact with portions of the target face of a document which have larger degrees of curving. This design allows more accurate measurement of contours of greatly tilting portions of the target face of a document which is adjacent to fastened portions of the document. In addition, as shown in FIG. 8, the mark on the document-guiding device 3 which roughly indicates the point at which the center of the document 2 is to be placed facilitates lateral positioning of the document 2.

Figure 9:
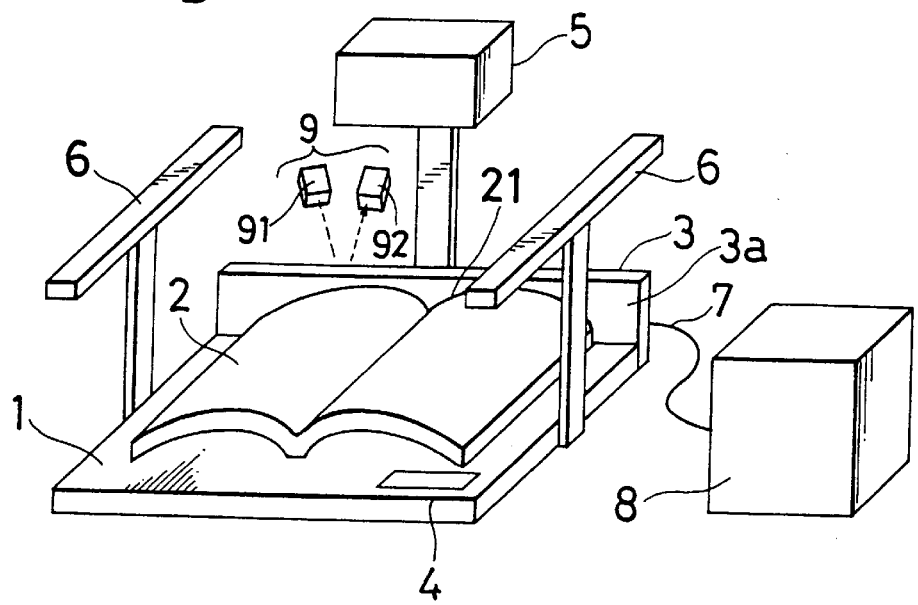
FIG. 9 is a schematic view illustrative of a second embodiment of the invention.

FIG. 9 is a schematic view of an image reading apparatus according to a second embodiment of the invention. This apparatus is constructed by providing the image reading apparatus shown in FIG. 1 with a document brightness determination device 9, and components identical or similar to those described with reference to FIG. 1 are denoted by the same characters. The document brightness determination device 9 comprises an IR light emitting element 91 and an IR sensor 92 which are arranged in such a manner as to allow measurement of brightness of the portion of the document 2 which is adjacent to its edge.

Figure 10A:
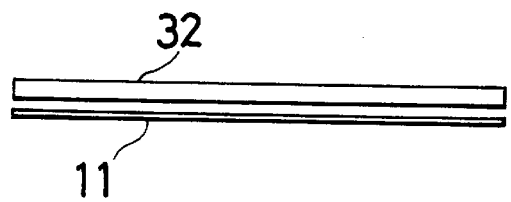
FIG. 10 A to C are views illustrative of the document-guiding device shown in FIG. 9.
Figure 10B:
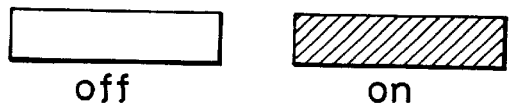
Figure 10C:
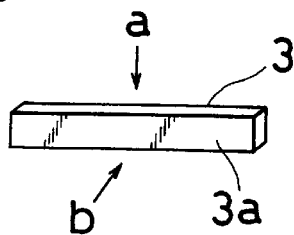

FIG. 10 is a view which illustrates an example of the document-guiding device 3. FIG. 10c is a perspective view of the document-guiding device 3, wherein FIGS. 10a and 10b are views of the document-guiding device 3 when viewed from directions indicated by the arrows a and b in the drawing. This document-guiding device 3 comprises a liquid crystal shutter 11 and a rear section 32. The liquid crystal shutter 11 is placed on the front surface of the rear section 32 which comes into contact with documents. The surface of the rear section 32 which faces the liquid crystal shutter 11 is black, and therefore, the positioning surface 3a of the document-guiding device 3 is black when the liquid crystal shutter 11 is in the ON position, that is, when the liquid crystal shutter 11 transmits light. Conversely, the positioning surface 3a is white when the liquid crystal shutter 11 is in the OFF position.

Figure 11:
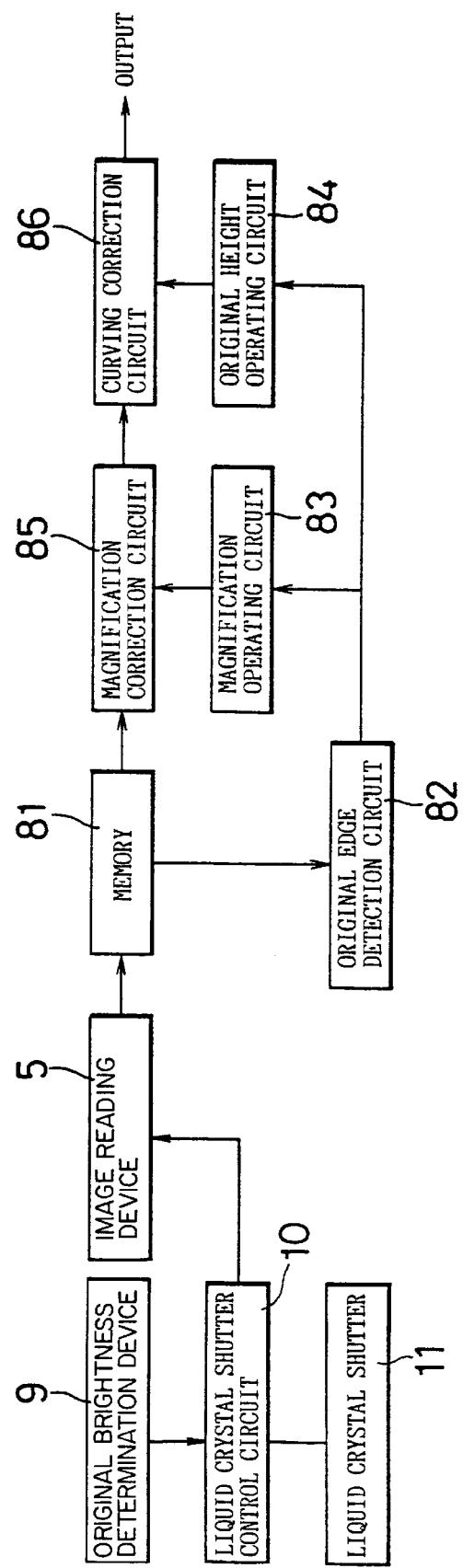
FIG. 11 is a schematic circuit diagram illustrative of the image processing device shown in FIG. 9.

FIG. 11 is a schematic circuit diagram of the image processing device 8 according to the embodiment. Components identical or similar to those described with reference to FIG. 2 are denoted by the same characters. The present embodiment is constructed by setting a document brightness determination device 9, a liquid crystal shutter control circuit 10 and a liquid crystal shutter 11 upstream from the image reading device 5 shown in FIG. 2. Therefore, components identical or similar to those described with reference to FIG. 2 are not explained.

The document brightness determination device 9 comprises an IR light emitting element 91 which emits IR, and an IR sensor 92 which determines the amount of IR reflected from the target face of the document. The brightness near the edge of the document 2 is determined based on the aforementioned amount of IR.

The liquid crystal shutter control circuit 10 performs the on/off control of the liquid crystal shutter 11 to vary the color (white or black) of the positioning surface 3a of the document-guiding device 3, on the basis of the results of the above determination by the document brightness determination device 9. More specifically, the positioning surface 3a is set to black in cases where the brightness is higher near the edge of the document 2, whereas the positioning surface 3a is set to white in cases where the brightness is lower near the edge of the document 2, as in the case where the document 2 is a photograph or the like.

In the same manner as with the first embodiment, the document edge detection circuit 82 detects the document edge 21 by converting the image data stored in the memory 82 into binary units by means of appropriate threshold values. With the present embodiment, however, since the color of the positioning surface 3a is varied depending on the brightness near the edge of the document 2 to make a difference in brightness at the boundary between the document 2 and the document-guiding device 3 (the document edge 21), the document edge 21 at any position may be detected easily.

Figure 12A:
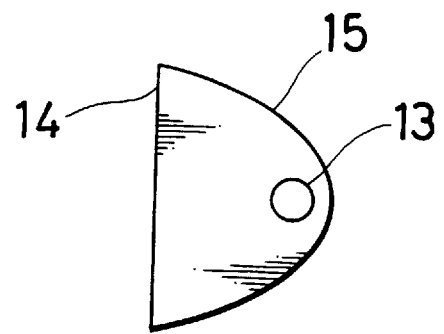
FIG. 12 A to C are views illustrative of another example of the document-guiding device shown in FIG. 9.
Figure 12B:
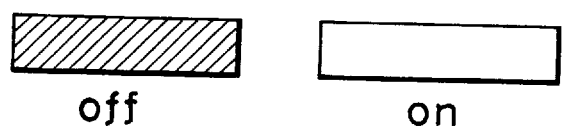
Figure 12C:
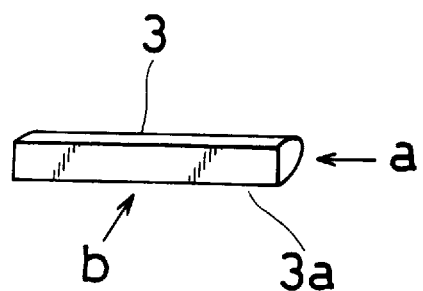
Figure 13:
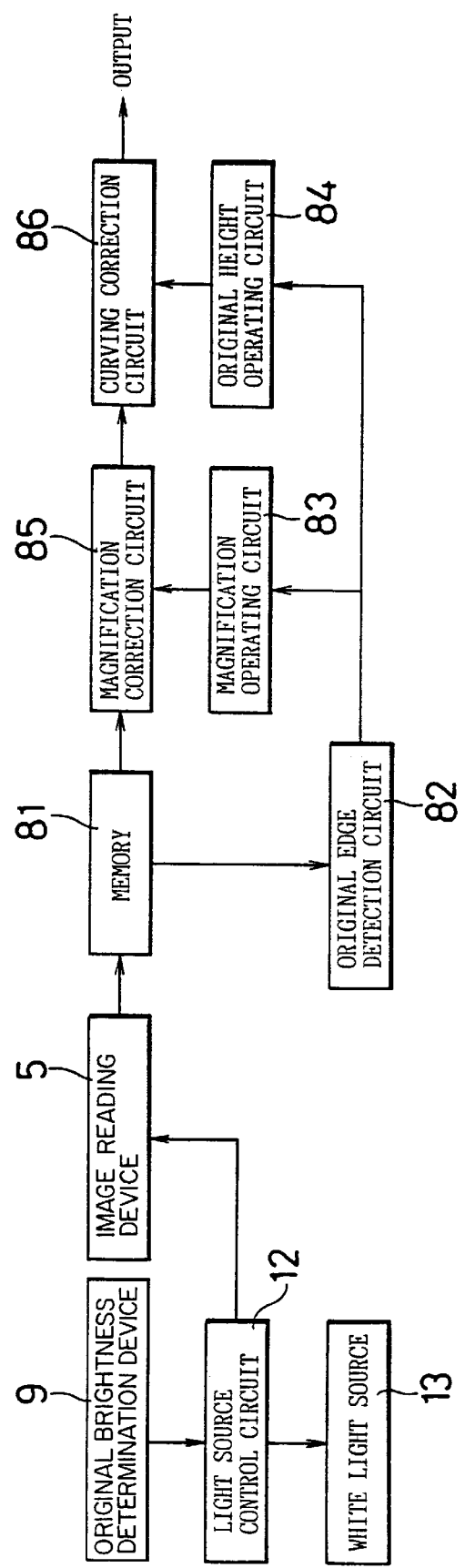
FIG. 13 is a schematic circuit diagram illustrative of the use of the document-guiding device shown in FIG. 12.

FIG. 12 is a view illustrative of another example of the document-guiding device 3. FIG. 12c is a perspective view of the document-guiding device 3, wherein FIGS. 12a and 12b are views of the document-guiding device 3 when viewed from directions indicated by the arrows a and b in the drawing. The document-guiding device 3 comprises a white light source 13, a reflector plate 15 and a black screen 14. In cases where the white light source 13 is in the OFF position, the positioning surface 3a is black, whereas the positioning surface 3a is white in cases where the white light source 13 is in the ON position since the light reflected from the reflector plate 15 is projected on the screen 14. FIG. 13 is a schematic circuit diagram for the image processing device 8 which illustrates the use of the document-guiding device 3. A light source control circuit 12 performs the on/off control of the white light source 13 on the basis of the results of the determination by the document brightness determination device 9. More specifically, the positioning surface 3a is set to black in cases where the brightness is higher near the edge of the document 2, whereas the registration surface 3a is set to white in cases where the brightness is lower near the edge of the document 2, as in the case where the document 2 is a photograph or the like.

Figure 14A:
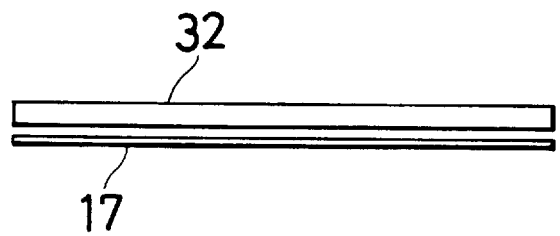
FIG. 14 A to C are views illustrative of an additional example of the document-guiding device shown in FIG. 9.
Figure 14B:
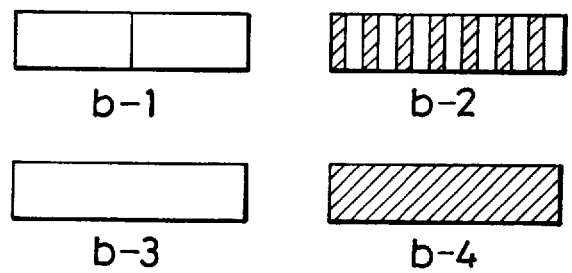
Figure 14C:
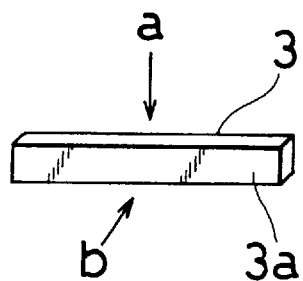
Figure 15:
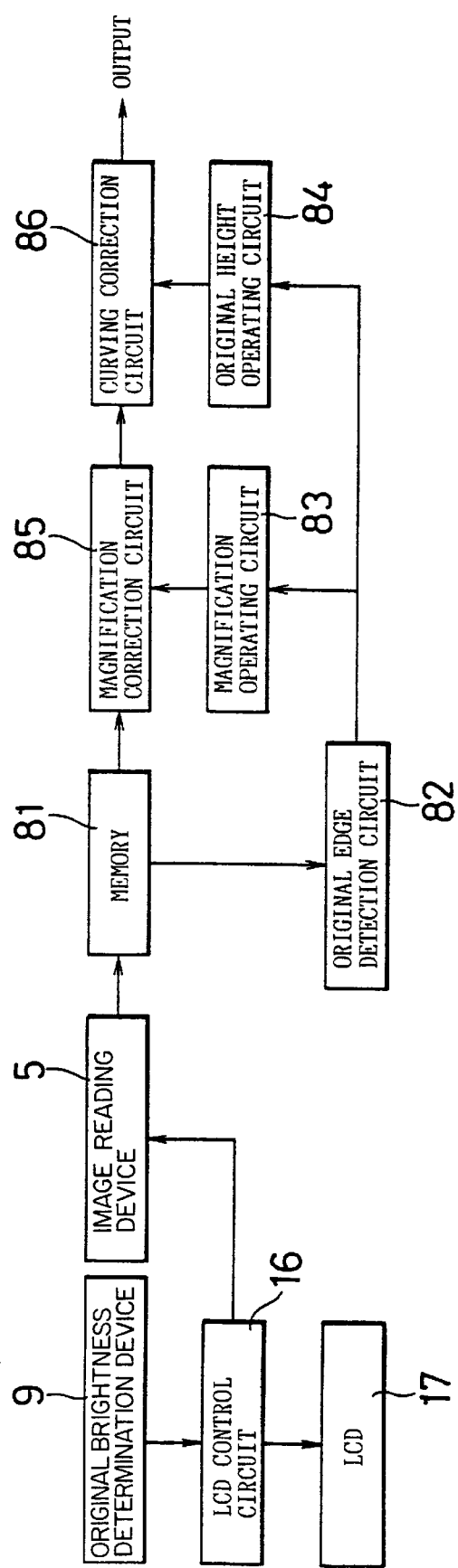
FIG. 15 is a schematic circuit diagram illustrative of the use of the document-guiding device shown in FIG. 14.

FIG. 14 is a view illustrative of an additional example of the document-guiding device 3. FIG. 14c is a perspective view of the document-guiding device 3, wherein FIGS. 14a and 14b are views of the document-guiding device 3 when viewed from directions indicated by the arrows a and b in the drawing. The document-guiding device 3 comprises a rear section 32 and a liquid crystal display (LCD) unit 17. FIG. 15 is a schematic circuit diagram for the image processing device 8 which illustrates the use of the document-guiding device 3. An LCD control circuit 16 controls the LCD unit 17 based on the results of the above determination by the document brightness determination device 9, and sets the background color of the display to white or black in order to facilitate the detection of the document edge 21 by the document edge detection circuit 82 ((b-3) and (b-4) in FIG. 14b). In addition, as shown in (b-1) and (b-2) in FIG. 14b, it is also possible to have a mark which roughly indicate the point at which the center of an document is to be placed and to have monochromic streaks.

With the present embodiment, the color of the positioning surface 3a is varied to white or black based on the results of the determination by the brightness determination device 9. Nevertheless, the surface 3a may be colored gray or otherwise.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image reading apparatus, comprising:

image reading means for reading an image of a document from above;

document-guiding means for positioning the document longitudinally by contacting an edge of the document;

detection means for detecting a boundary between the document and the document-guiding means based on the image read by the image reading means;

height operating means for calculating height of the document based on the boundary detection;

image processing means for correcting the image to create a nearly distortion-free image by magnification-reduction; and determination means for determining brightness of the document proximate to the detected boundary, wherein the document-guiding means includes means for varying brightness of a surface of the document-guiding means contacting the document based upon the determination by the determination means.

2. The image reading apparatus according to claim 1, wherein the means for varying the brightness includes a liquid crystal shutter.

3. The image reading apparatus according to claim 1, wherein the means for varying the brightness includes a screen and a light source located behind the screen.

4. The image reading apparatus according to claim 1, wherein the means for varying the brightness includes a liquid crystal display unit.

5. The image reading apparatus according to claim 1, wherein the document-guiding means includes an indication indicating a location at which a center of each document is to be placed on the surface of the document-guiding means contacting the document.

6. The image reading apparatus of claim 1, wherein the image reading means includes a line sensor.

7. The image reading apparatus of claim 1, wherein the means for varying brightness varies brightness so as to increase a difference in brightness between the surface of the document guiding means and the document.

8. An image reading method comprising the steps of;

positioning a document by contacting an edge of the document with a surface of a document guide;

transmitting light from the surface of the document guide;

detecting an edge of the document;

determining brightness of the document proximate to the detected edge;

changing a brightness of the light transmitted from the surface of the document guide based upon the determined brightness; and reading the document.

9. The image reading method of claim 8, wherein the step of reading includes scanning the document with a line sensor.

10. The image reading method of claim 8, wherein said step of transmitting light comprises transmitting light from a light source located behind the surface of the document guide, the surface of the document guide being a screen.

11. The image reading method of claim 8, wherein the surface of the document guide comprises a liquid crystal shutter which transmits light.

12. The image reading method of claim 8, wherein the surface of the document guide comprises a liquid crystal display unit which transmits light.

13. An image reading apparatus, comprising;

scanning means for scanning a document;

document guiding means, having a surface which contacts an edge of the document, for positioning the document;

detecting means for detecting the edge of the document; and determination means for determining brightness of the document proximate to the detected edge, the surface of said document guiding means transmitting light, a brightness of the transmitted light being variable based upon the determined brightness.

14. The image reading apparatus of claim 13, wherein said scanning means includes a line sensor.

15. The image reading apparatus according to claim 13, wherein the surface of said document guiding means comprises a liquid crystal shutter.

16. The image reading apparatus according to claim 13, wherein the surface of said document guiding means is a screen and said document guiding means further comprises a light source located behind the screen.

17. The image reading apparatus according to claim 13, wherein the surface of said document guiding means comprises a liquid crystal display unit.

18. The image reading apparatus according to claim 13, wherein the surface of said document guiding means includes an indication indicating a location at which a center of each document is to be placed along the surface of said document guiding means contacting the document.

* * * * *